(12) United States Patent
Mello et al.

(10) Patent No.: US 10,519,045 B2
(45) Date of Patent: Dec. 31, 2019

(54) SYSTEMS AND METHODS FOR DEAERATING SEAWATER USING A ROTATING PACKED BED DEVICE

(71) Applicant: Chevron U.S.A. Inc., San Ramon, CA (US)

(72) Inventors: Marcus V. Dutra e Mello, Moraga, CA (US); Hua-Min Huang, Hercules, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 434 days.

(21) Appl. No.: 15/211,284

(22) Filed: Jul. 15, 2016

(65) Prior Publication Data
US 2018/0016159 A1  Jan. 18, 2018

(51) Int. Cl.
*E21B 43/20* (2006.01)
*E21B 43/40* (2006.01)
(Continued)

(52) U.S. Cl.
CPC ............ *C02F 1/20* (2013.01); *B01D 19/0052* (2013.01); *C02F 1/38* (2013.01); *C02F 1/40* (2013.01); *C02F 1/44* (2013.01); *C02F 1/50* (2013.01); *C02F 1/683* (2013.01); *C02F 5/08* (2013.01); *E21B 43/20* (2013.01); *E21B 43/40* (2013.01);
(Continued)

(58) Field of Classification Search
CPC ..... E21B 43/20; E21B 43/40; B01D 19/0036; B01D 19/0052; C02F 1/20; C02F 1/38; C02F 1/40; C02F 1/44; C02F 1/50; C02F 1/683; C02F 5/08
See application file for complete search history.

(56) References Cited

U.S. PATENT DOCUMENTS

| 4,382,900 A * | 5/1983 | Wern ............... B01D 3/30 261/89 |
| 7,326,283 B2 | 2/2008 | Gardner et al. |

(Continued)

OTHER PUBLICATIONS

Peel et al., "Process Intensification: Higee Seawater Deaeration", Chemical Engineering Research and Design, Elsevier, Amsterdam, NL, vol. 76., No. 5, Jul. 1, 1998, pp. 585-593.
(Continued)

*Primary Examiner* — Matthew R Buck
(74) *Attorney, Agent, or Firm* — Karen Didomenicis; Howard Owens (57) ABSTRACT

Seawater is deaerated using a rotating packed bed device having one or more rotatable packing rings within a housing, a liquid inlet for infusing seawater into an interior region defined by the packing rings, a gas outlet for accepting gas which has passed radially inwardly through the packing rings and removing the gas from the interior region, and a liquid outlet for removing a deaerated seawater stream from the housing. A shaft coupled to a motor drives the packing rings causing the packing rings to rotate. The feed seawater stream passes radially outwardly through each of the packing rings thereby forming the deaerated seawater stream having a lower concentration of oxygen, air and/or carbon dioxide therein than the feed seawater stream and a gas stream having been removed from the feed seawater stream. The deaerated seawater stream is then injected into a hydrocarbon producing reservoir in an EOR process.

39 Claims, 8 Drawing Sheets

(51) Int. Cl.
  *C02F 1/20* (2006.01)
  *B01D 19/00* (2006.01)
  *C02F 1/38* (2006.01)
  *C02F 1/40* (2006.01)
  *C02F 1/44* (2006.01)
  *C02F 1/50* (2006.01)
  *C02F 1/68* (2006.01)
  *C02F 5/08* (2006.01)
  *C02F 101/16* (2006.01)
  *C02F 103/08* (2006.01)

(52) U.S. Cl.
  CPC ...... *C02F 2101/16* (2013.01); *C02F 2103/08* (2013.01)

(56) References Cited

U.S. PATENT DOCUMENTS

| | | | |
|---|---|---|---|
| 7,537,644 | B2 | 5/2009 | Park et al. |
| 8,448,926 | B2 | 5/2013 | Mello et al. |
| 8,702,071 | B2 | 4/2014 | Mello et al. |
| 9,216,377 | B1 | 12/2015 | Mello et al. |
| 2004/0120853 | A1* | 6/2004 | Carpenter ............... A01N 59/00 422/37 |
| 2007/0034565 | A1* | 2/2007 | Park ......................... B01D 1/14 210/619 |
| 2007/0295662 | A1* | 12/2007 | Park ................... B01D 19/0057 210/640 |
| 2011/0131937 | A1* | 6/2011 | Ming ................. B01D 53/1475 55/474 |
| 2011/0303088 | A1* | 12/2011 | Dutra E Mello ........ B01D 3/08 95/151 |
| 2013/0319235 | A1 | 12/2013 | Wolf et al. |

OTHER PUBLICATIONS

Frank, Wallace J., Efficient Removal of Oxygen and a Waterflood by Vacuum Deaeration, 47th Annual Fall Meeting of the Society of Petroleum Engineers of AIME, Oct. 8-11, 1972.

* cited by examiner

FIG. 8 ns for deaerating the feed seawater stream. The system includes the rotating packed bed device as described above and a water injection means connected to the liquid outlet of the rotating packed bed device for injecting seawater deaerated in the rotating packed bed device into a hydrocarbon producing reservoir to maintain pressure and to enhance oil recovery from the hydrocarbon producing reservoir.

SYSTEMS AND METHODS FOR DEAERATING SEAWATER USING A ROTATING PACKED BED DEVICE

FIELD

The present disclosure relates to systems and methods useful for deaerating seawater, particularly utilizing rotating packed bed devices. The disclosure further relates to processes for water injection to enhance oil recovery from subterranean reservoirs.

BACKGROUND

Water injection in which water is pumped into a hydrocarbon producing reservoir has been practiced in the oil and gas industry to maintain reservoir pressure and enhance oil recovery (EOR) at both onshore and offshore reservoirs locations. Water to be injected needs to be deaerated, i.e., removing undesirable gases such as oxygen, before injection to contain the growth of microorganisms and to prevent corrosion of underground piping. Vacuum packed tower stripping or fuel gas packed tower stripping followed by treatment with oxygen scavenging chemicals is conventionally practiced to deaerated water prior to water injection in EOR systems. Other technologies that utilize catalysts can also be employed to remove oxygen (e.g., Minox™ commercially available from Minox Technology AS, Notodden, Norway).

There exists a need for improved alternative systems and methods which provide deaerated water suitable for injection in EOR. It would be desirable to have systems and methods offering improved cost, weight and compactness for deployment on offshore platforms and vessels.

SUMMARY

In one aspect, a method for deaerating a feed seawater stream containing oxygen, air and/or carbon dioxide. The method includes providing a rotating packed bed device comprising one or more rotatable packing rings disposed within a housing wherein the one or more rotatable packing rings define an interior region; a liquid inlet in the housing for feeding a liquid into the interior region, the liquid inlet in communication with an exit port disposed in the interior region for infusing the liquid into the interior region; a gas outlet in the housing for accepting gas which has at least partially passed radially inwardly through the one or more rotatable packing rings and removing the gas from the interior region; a liquid outlet in the housing for removing a deaerated seawater stream from the housing; a rotatable shaft coupled to the one or more rotatable packing rings for causing the one or more rotatable packing rings to rotate; and a motor coupled to the rotatable shaft for driving the rotatable shaft. The feed seawater stream is infused by way of the exit port into the interior region. The feed seawater stream passes radially outwardly through each of the one or more rotatable packing rings thereby forming the deaerated seawater stream having a lower concentration of oxygen, air and/or carbon dioxide therein than the feed seawater stream and a gas stream comprising oxygen, air and/or carbon dioxide having been removed from the feed seawater stream. The deaerated seawater stream is removed from the housing through the liquid outlet and is fed to one or more level control vessels. The gas stream having at least partially passed through the one or more rotatable packing rings is removed from the interior region through the gas outlet.

In another aspect, a system is provided for deaerating the feed seawater stream. The system includes the rotating packed bed device as described above and a water injection means connected to the liquid outlet of the rotating packed bed device for injecting seawater deaerated in the rotating packed bed device into a hydrocarbon producing reservoir to maintain pressure and to enhance oil recovery from the hydrocarbon producing reservoir.

DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

DETAILED DESCRIPTION

Described herein are embodiments of systems and methods for deaerating a feed seawater stream, i.e., removing undesirable gases from the feed seawater stream. The feed seawater stream can be pumped from the sea and may contain oxygen, air and/or carbon dioxide. The methods disclosed herein can be used to remove or reduce the amount of oxygen, air and/or carbon dioxide from the seawater, thereby forming a deaerated seawater stream that is useful for injecting into oil and gas producing reservoirs to enhance recovery of the oil and gas.

Figure 1:
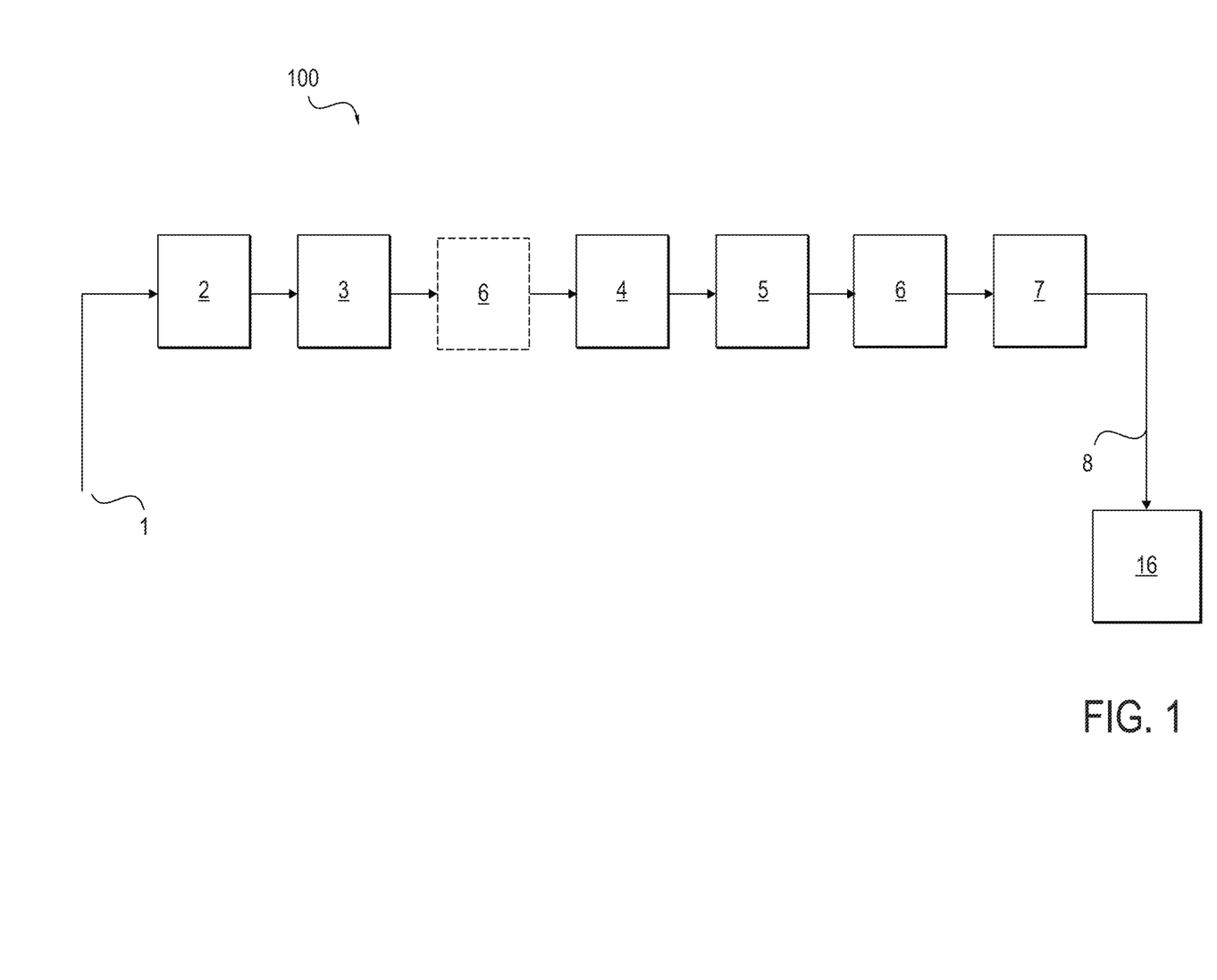
FIG. 1 is a block diagram illustrating a system according to one exemplary embodiment.

Referring to FIG. 1, methods disclosed herein can utilize a system 100 including a rotating packed bed device 4, also referred to as a RPB, and an lift pump system 2 connected to a liquid inlet of the rotating packed bed device 4 for drawing seawater 1 from an ocean environment and a filtration system 3 in fluid communication with the lift pump system 2 for filtering the seawater 1. The system 100 also includes a water injection means 7 for injecting the deaerated seawater stream 8 into a hydrocarbon producing reservoir 16. The system 100 can also include a level control vessel 5 and a membrane unit 6 for removing sulfates from the deaerated seawater stream. Optionally, the membrane unit 6 can also be placed upstream of the RPB 4.

Figure 2:
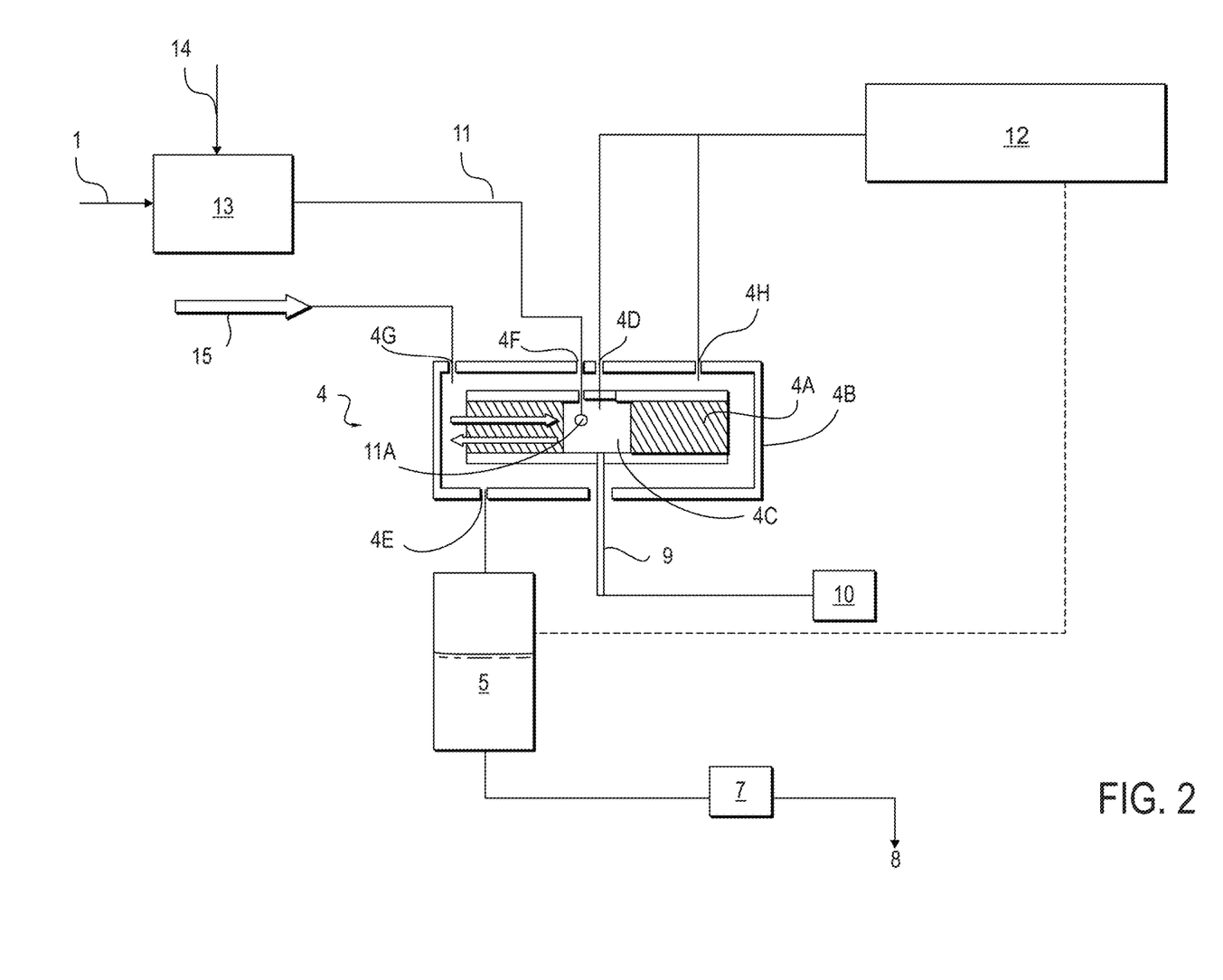
FIG. 2 is a schematic diagram illustrating a system according to another exemplary embodiment.

Referring to FIG. 2, the rotating packed bed device 4 includes one or more rotatable packing rings 4A disposed within a housing 4B. The one or more rotatable packing rings 4A can generally have the shape of a thick cylindrical disk having a hollow central axial portion or space, also referred to herein as an interior region 4C, such that the rotatable packing rings 4A surrounding the interior region define the interior region 4C. The high gravity created by the centrifugal force of the rotating packing rings 4A allows the use of unique packing materials with very high surface area and fine pore diameter. The rotatable packing rings 4A can be made from a suitable material selected from metal foam, plastic, composite, stainless steel, titanium, super duplex stainless steel alloy, metal or non-metal wire mesh and porous materials including glass. Gas flows counter-currently to liquid in the RPB 4 from the outside of the packing rings 4A toward the center of the packing rings (radially inwardly) and exits the RPB from a center axis outlet 4D. The high centrifugal force that is created by the RPB packing rings 4A allows the formation of thin liquid films, small droplets and high liquid-gas interfacial areas in the packing leading to significant enhancements in mass transfer. The liquid spins out of the RPB packing rings 4A, hits the RPB housing 4B, and exits at the RPB liquid outlet 4E.

A rotatable shaft 9 can be coupled to the one or more rotatable packing rings 4A to cause the one or more rotatable packing rings 4A to rotate. A motor 10 can be coupled to the rotatable shaft 9 to drive the rotatable shaft. In some embodiments, the packing rings 4A are able to rotate at a tip velocity of from 4 m/s to 80 m/s. In some embodiments, the packing rings 4A are able to rotate at a speed of from 500 to 2500 rpm.

A liquid inlet 4F is provided in the housing 4B for feeding a liquid, i.e. seawater 1, into the interior region 4C. The terms liquid and seawater may be used interchangeably herein. The liquid inlet 4F is in communication via a conduit 11 with an exit port 11A disposed in the interior region 4C for infusing the liquid 1 into the interior region 4C. During operation in which the packing rings 4A rotate, the liquid passes radially outwardly through the packing rings 4A in which the liquid is deaerated thereby forming a deaerated seawater stream 8 having a lower concentration of oxygen, air and/or carbon dioxide therein than the feed seawater stream 1. A liquid outlet 4E is provided in the housing 4B for removing the deaerated seawater stream from the housing.

A gas outlet 4D connected to a conduit is provided in the housing 4B for accepting gas which has at least partially passed radially inwardly through the one or more rotatable packing rings 4A, i.e. gas that has been removed from the liquid 1, and removing the gas from the interior region 4C. This gas may contain oxygen, air, nitrogen and/or carbon dioxide. Other gases may optionally also be present. In some embodiments, the gas stream from the gas outlet 4D is sent to a vacuum pump 12. In some embodiments, the gas stream from the gas outlet 4D is sent to a vent, a flare or a combination thereof.

In some embodiments, again referring to in FIG. 2, the feed seawater stream 1 is mixed with at least one additive 14 prior to or concurrently with infusing the feed seawater stream 1 by way of the exit port 11A into the interior region 4C to further reduce the oxygen concentration in the deaerated seawater stream 8. The at least one additive 14 can include oxygen scavengers. Suitable oxygen scavengers can include, for example, bisulfate salt, sodium sulfite, sodium erythorbate, hydrazine and combinations thereof. In one embodiment, other additives can include antiscalant agents and biocide agents. In one embodiment, the additive 14 is mixed with the seawater 1 in a mixer 13. In one embodiment, the additive 14 is mixed with water and fed to the rotating packed bed device 4 through a second liquid inlet (not shown) for receiving the mixture of the additive and water.

In some embodiments, a gas inlet 4G is provided in the housing 4B to allow a gas stream 15 to be injected into the housing. This gas stream 15 can be essentially free of oxygen so that it will act as a stripping gas to assist in deaerating the seawater stream 1. This gas stream 15 may be referred to interchangeably herein as the stripping gas and the gas stream essentially free of oxygen. Suitable gases for use as the stripping gas 15 may include fuel gas, which can be mostly methane, nitrogen, carbon dioxide and combinations thereof. Nitrogen can be available for instance when it is produced by carbon molecular sieves pressure swing adsorption. If high purity nitrogen is used as the stripping gas, greenhouse gas methane release is eliminated and the RPB water deaeration safety will be further assured because the fuel gas (such natural gas) is eliminated in the operation. In one embodiment, the ratio of the stripping gas 15 to the feed seawater stream 1 is from 1 to 10 standard cubic feet of gas per standard cubic feet of liquid and the feed seawater stream 1 and the stripping gas 15 pass through each of the one or more rotatable packing rings 4A. In one embodiment, the ratio of the stripping gas 15 to the feed seawater stream 1 is from 0.1 to 2 standard cubic feet of gas per barrel of seawater, if vacuum is also used as driving force to deaerate the seawater 1. As will be readily understood by one of ordinary skill in the art, when stripping gas 15 is fed to the RPB 4, much of the gas that is removed at the gas outlet 4D will have passed through the rotating packing rings 4A. In embodiments in which stripping gas 15 is not fed to the RPB, a portion of the gas that is removed at the gas outlet 4D will have passed through at least a portion of the material of the rotating packing rings 4A.

In some embodiments, vacuum is applied to the gas outlet of the rotating packed bed device by connecting the gas outlet 4D of the rotating packed bed device to a source of vacuum 12. The source of vacuum 12 can be used to maintain the pressure in the rotating packed bed device at from 10 mm Hg to 250 mm Hg absolute, and even from 15 mm Hg to 30 mm Hg absolute. Suitable sources of vacuum 12 include, but are not limited to, one or more liquid ring vacuum pumps, one or more ejectors or a combination of liquid ring vacuum pumps and ejectors. A vacuum port 4H can also be provided in the housing 4B and vacuum can be applied to the vacuum port 4H as well as to the gas outlet 4D. As shown, a vacuum port can also be attached to the level control vessel 5.

The deaerated seawater stream 8 can be injected into a hydrocarbon producing reservoir 16 to enhance the production of oil and gas from the reservoir. The deaerated water 8 can be injected using a water injection means 7 in fluid communication with the liquid outlet 4E of the rotating packed bed device 4. In one embodiment, one or more injection pumps can be used as the water injection means 7 to inject the water into the reservoir. In one embodiment, one or more vessels 5 can be provided for receiving the deaerated seawater from the liquid outlet 4E of the rotating packed bed device and providing the deaerated seawater to the injection pumps 7. Such vessels 5 act to accumulate deaerated water 8 to be injected into the reservoir thereby decreasing the risk that the injection pumps 7 could run dry.

In some embodiments, the feed seawater stream 1 is filtered before being fed to the interior region 4C of the rotating packed bed device. Any suitable means of filtering 3 can be placed upstream of the liquid inlet 4F. Likewise, the feed seawater stream 1 can be optionally filtered for sulfates by passing the feed seawater stream through a membrane unit 6 located either upstream of the liquid inlet 4F or downstream of the level control vessel 5.

Figure 3:
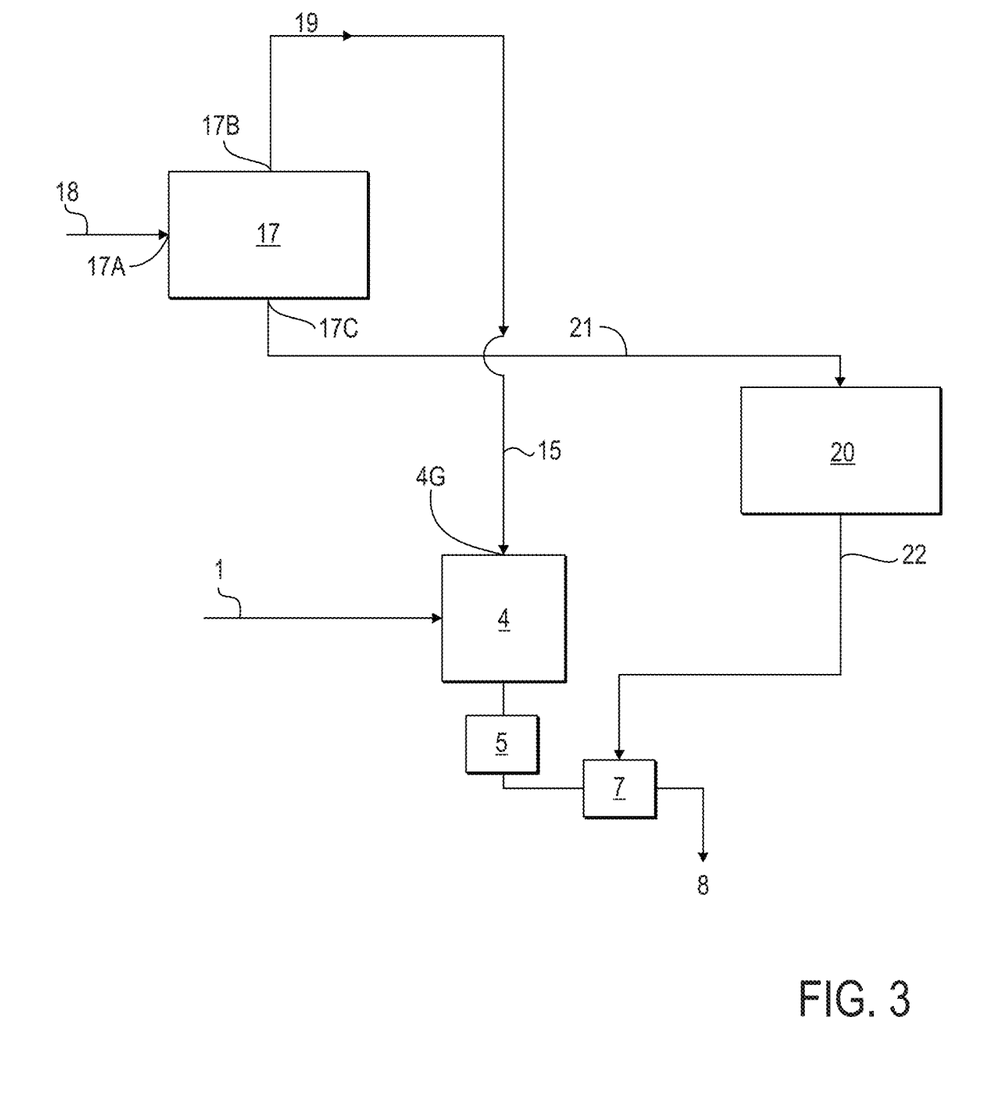
FIG. 3 is a block diagram illustrating a system according to yet another exemplary embodiment.
Figure 4A:
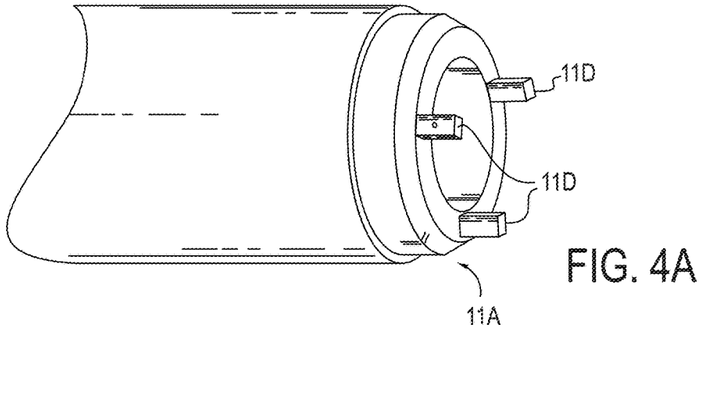
FIGS. 4A-4D are views of a liquid distributor according to yet another exemplary embodiment.
Figure 4B:
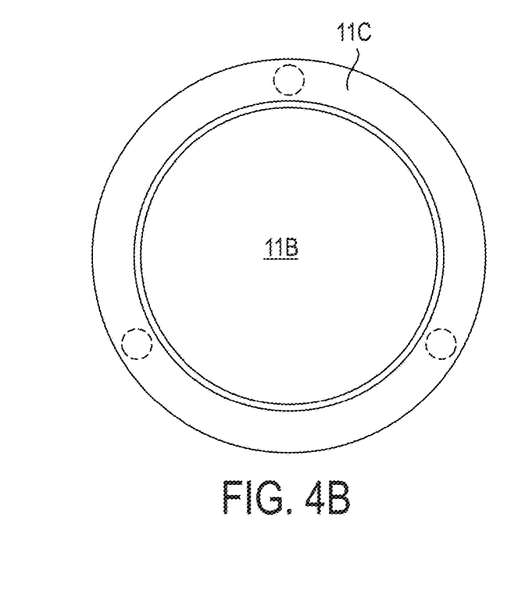
Figures 4C, 4D:
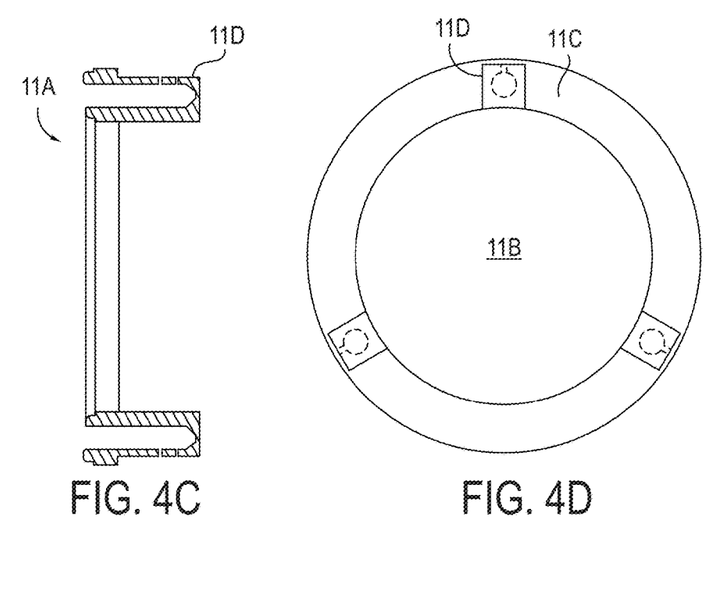

Referring to FIG. 3, in some embodiments, a separator 17 having at least an inlet 17A and a gas outlet 17B is provided in fluid communication with the hydrocarbon producing reservoir 16. The separator 17 is used to separate produced fluids 18 from the reservoir into an oil phase, a gas phase and an aqueous phase. In one embodiment, the gas phase from the separator 17 can be fed to the gas inlet 4G, in the embodiments having a gas inlet, of the rotating packed bed device 4 as the stripping gas 15. A line 19 connects the gas outlet 17B on the separator 17 to the gas inlet 4G of the rotating packed bed device 4. In one embodiment, salts can be removed from the aqueous phase from the separator 17 using a filter 20 prior to passing the aqueous phase to the water injection means 7. A line 21 can connect the aqueous phase outlet 17C on the separator 17 to the filter 20, and a line 22 can connect the filter to the water injection means 7.

In one embodiment, the rotating packed bed device 4 has a height of from 12 feet to 20 feet. This size is advantageous for locating the rotating packed bed device 4 in a location where space is limited, such as on an offshore platform or floating vessel (not shown).

Certain known configurations of rotating packed bed devices 4 are suitable for use in the methods and systems disclosed herein. For example, those rotating packed bed devices disclosed in U.S. Pat. Nos. 8,448,926; 8,702,071 and 9,216,377 (Dutra e Mello et al., all coassigned), the contents of which are incorporated herein by reference.

The liquid inlet 4F is in communication via a conduit 11 with an exit port 11A disposed in the interior region 4C for infusing the liquid 1 into the interior region 4C. In one embodiment, as shown in FIGS. 4A-4D, the liquid inlet 4F of the rotating packed bed device 4 further includes a liquid distributor. The conduit 11 has a central conduit 11B and an annulus 11C around the conduit. Liquid seawater 1 is fed into the RPB annular conduit 11C and is distributed into the packing 4A through the liquid distributor. The annulus 11C is in fluid communication with a plurality of protruding tabs 11D that extend into the interior region 4C. The protruding tabs have a plurality of exit ports therein for infusing the liquid 1 into the interior region 4C. The central conduit 11B in fluid communication with the interior region serves as the gas outlet 4D.

Figure 5:
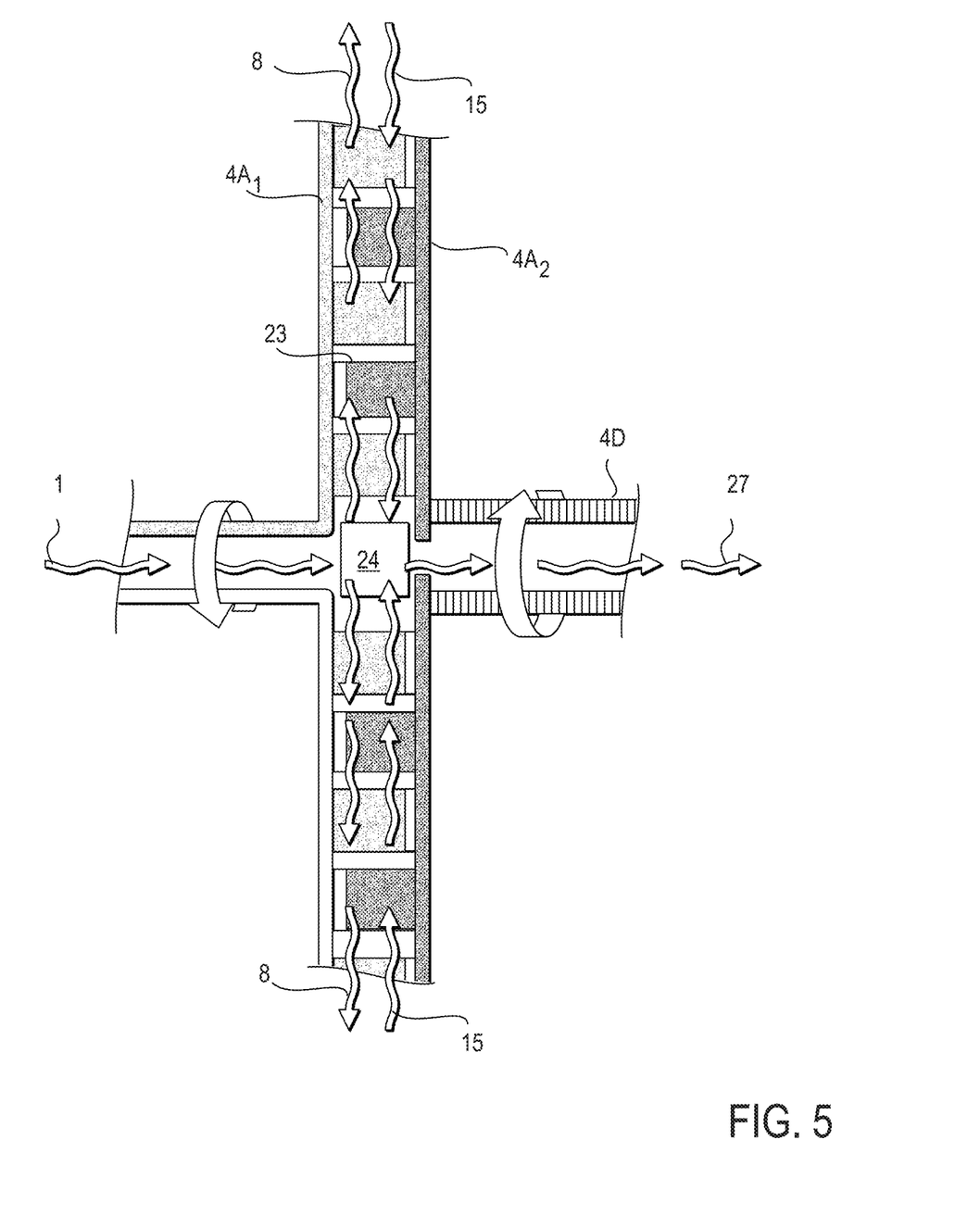
FIG. 5 is a simplified view of a rotating packed bed device according to yet another exemplary embodiment.
Figure 6:
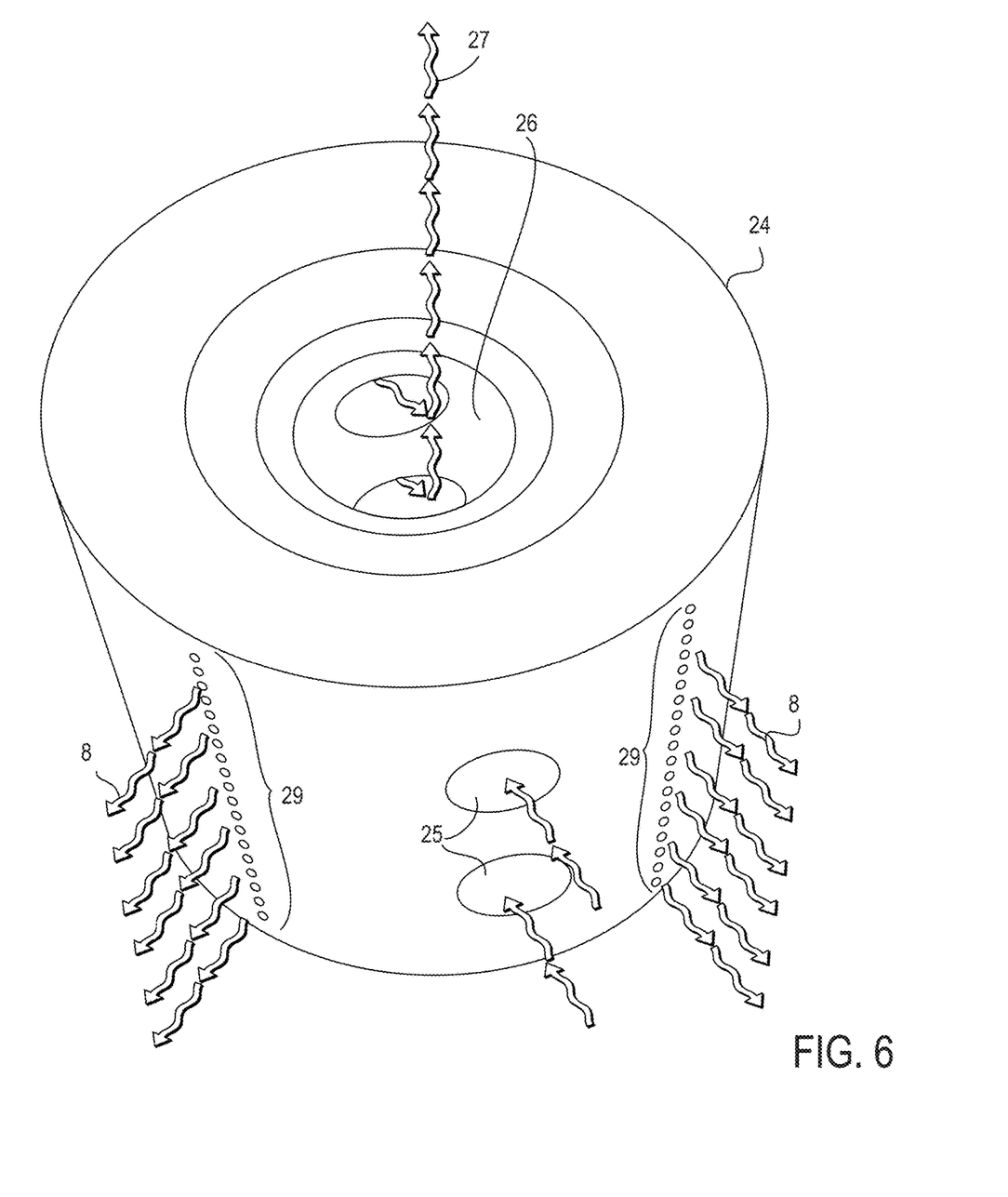
FIG. 6 is a simplified view of a rotating packed bed device according to yet another exemplary embodiment.

In one embodiment, referring to FIGS. 5 and 6, the rotating packed bed device 4 includes two rotatable sets of packing rings $4A_1$ and $4A_2$ to further enhance the mass transfer between the liquid 1 and the gas 15. The rotation of each of the two rotatable sets of packing rings is driven by a separate shaft coupled to a separate motor (not shown). In one embodiment, two rotors connected to rotatable sets of packing rings $4A_1$ and $4A_2$ can rotate in co-current direction. In another embodiment, the two rotatable sets of packing rings $4A_1$ and $4A_2$ rotate in countercurrent direction. The set of rings on the right $4A_2$ has two rings, and the set of rings on the left $4A_1$ has three rings. The number of rings in a set can vary, however, depending on the number desired for a particular process. A generally hollow cylindrical liquid distributor 24 is positioned in the middle of the rotors, through which liquid 1 enters and is dispersed to the packing rings, and gas is collected and withdrawn after passing through the packing rings in countercurrent or concurrent fashion to the liquid. Liquid 1 enters, passes through the generally hollow cylindrical liquid distributor 24 and leaves the packing rings as 8. When operating with stripping gas or a combination of stripping gas and vacuum, gas that is dissolved in the seawater and stripping gas 15 enters the packing rings and leaves the RPB at the gas outlet 4D as 27. Gaps 23 exist between the sets of packing rings $4A_1$ and $4A_2$. In this embodiment, vacuum only can also be employed as the sole driving force to remove gas 27 from the seawater.

In one embodiment, as shown in FIG. 6, the rotating packed bed device 4 includes a generally hollow cylindrical liquid distributor 24 having the gas flow as shown. Gas that has passed through the packing is accepted in the gas outlet orifices 25. In one exemplary, nonlimiting embodiment, there are eight 1 inch orifices extending radially through the liquid distributor as the gas outlet orifices. The gas then converges into a center conduit 26 that will evacuate the gas 27 from the packed bed and interior region. Liquid 8 that is dispersed from the generally hollow cylindrical liquid distributor 24 exits from a number of small liquid orifices 29 extending radially through the generally hollow cylindrical liquid distributor 24.

Figure 7:
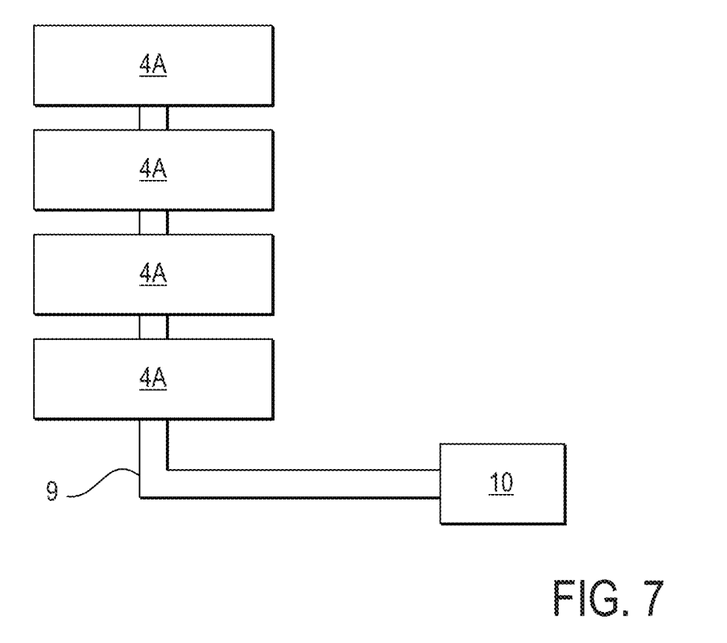
FIG. 7 is a block diagram illustrating a system according to yet another exemplary embodiment.

In one embodiment, as shown in FIG. 7, a system can include multiple rotating packed bed devices 4 arranged in parallel such that the shaft 9 coupled to the motor 10 is coupled to the one or more rotatable packing rings 4A of each of the multiple rotating packed bed devices 4.

Figure 8:
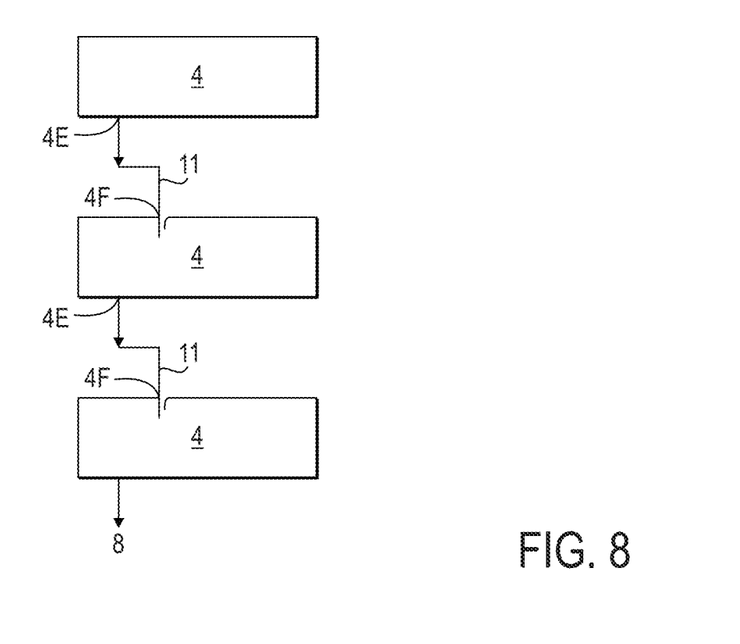
FIG. 8 is a block diagram illustrating a system according to yet another exemplary embodiment.
Figure 9:
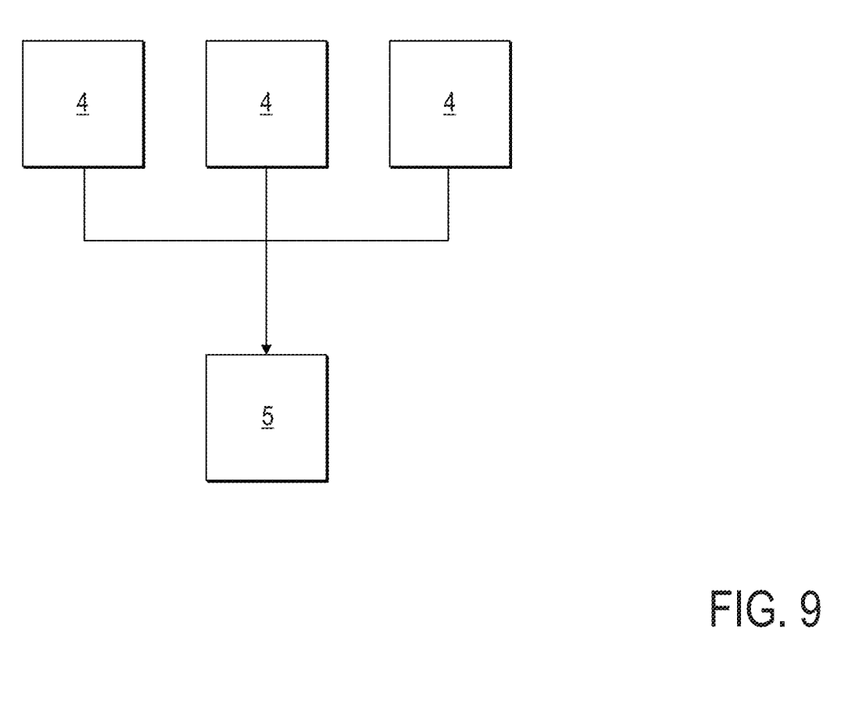
FIG. 9 is a block diagram illustrating a system according to yet another exemplary embodiment.

In one embodiment, as shown in FIG. 8, a system can include multiple rotating packed bed devices 4 arranged in series such that the liquid outlet 4E of a first rotating packed bed device 4 is connected to a liquid inlet 4F of a second rotating packed bed device 4. Such an arrangement can be used to improve deaeration performance by lowering the final oxygen concentration. One level control vessel 5 for each RPB 4 can be used when multiple RPBs are present. Alternatively, as shown in FIG. 9, multiple RPBs 4 can optionally be connected to only one or more level control vessel 5, depending on space and cost considerations.

Use of the methods and systems disclosed herein can result in the provision of deaerated seawater suitable for water injection in EOR with the advantages of low cost, low weight, small footprint and compact overall size, making the methods and systems well-suited for use on offshore platforms in vessels. In addition, the methods and equipment disclosed herein are expected to deliver lower oxygen content in the deaerated seawater product with increased reliability. It should be noted that only the components relevant to the disclosure are shown in the figures, and that other components normally part of a rotating packed bed device and/or an EOR system are not shown for simplicity.

EXAMPLES

Example 1

The following example demonstrates the continuous removal of oxygen and other gases from a seawater stream using fuel gas consisting primarily of methane at ambient pressure using a rotating packed bed device with one rotatable bed. Seawater at approximately 75-80° F. (24-27° C.) was continuously contacted with fuel gas to strip off the oxygen and other gases. Using a packing bed made out of metal foam and under a rotating speed of 1000 RPM and at different seawater flowrates, the results in Table 1 indicate water containing as low as 41 ppb oxygen in the seawater product was achieved. The concentration of oxygen in the seawater product changed with the amount of stripping gas that was introduced into the rotating packed bed. When the gas to liquid ratio (G/L) was increased, the performance for oxygen removal increased due to improved mass transfer, as shown in the data in Table 1. The concentration of oxygen in in the seawater feed ranged from 6 ppm to 7 ppm. The concentrations of oxygen in the feed and in the product were measured by a probe manufactured by Emerson Electric Company (St. Louis, Mo.). The device was also run under reduced seawater flowrate conditions (50% and 33% by volume) at a similar gas to liquid ratio. The results demonstrated that the performance was similar and indicated that the significant reduction in throughput did not change the device's performance.

TABLE 1

| Water flowrate (gpm) | Gas Flowrate (SCFM) | G/L ratio | Oxygen in feed (ppm) | Oxygen in product (ppb) |
|---|---|---|---|---|
| 6 | 3.5 | 4.4 | 6.65 | 41 |
| 6 | 3 | 3.7 | 6.53 | 47 |
| 6 | 2.5 | 3 | 6.69 | 53 |
| 4 | 2 | 3.7 | 6.65 | 41 |
| 4 | 1.6 | 3 | 6.65 | 49 |
| 2 | 1 | 3.7 | 6.59 | 48 |
| 2 | 0.8 | 3 | 6.59 | 48 |
| 6 | 3.5 | 4.4 | 6.65 | 41 |
| 6 | 5.0 | 5 | 6.47 | 36 |
| 6 | 6.2 | 6.2 | 6.46 | 29 |

Example 2

The following example demonstrates the continuous removal of oxygen from seawater while applying vacuum using a single vacuum pump connected to the gas outlet of the rotating packed bed device. No stripping gas was used during this experimental run. Seawater at approximately 75-80° F. (24-27° C.) was continuously introduced into the rotating packed bed device. Using a packing bed made out of metal foam and under a rotating speed of 1000 RPM, the results in Table 2 indicate water containing as low as 40 ppb oxygen in the seawater product was achieved.

TABLE 2

| Water (gpm) | Oxygen in (ppm) | Oxygen out (ppb) | Vacuum pressure (mmHg abs) |
|---|---|---|---|
| 2 | 6.88 | 40 | 24.5 |

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A method for deaerating a feed seawater stream containing an oxygen, an air, a nitrogen and/or a carbon dioxide, comprising:
   a. providing a rotating packed bed device comprising one or more rotatable packing rings disposed within a housing wherein the one or more rotatable packing rings define an interior region; a liquid inlet in the housing for feeding a liquid into the interior region, the liquid inlet in communication via a conduit with an exit port disposed in the interior region for infusing the liquid into the interior region; a gas outlet in the housing for accepting a gas which has at least partially passed radially inwardly through the one or more rotatable packing rings and removing the gas from the interior region; a liquid outlet in the housing for removing a deaerated seawater stream from the housing; a rotatable shaft coupled to the one or more rotatable packing rings for causing the one or more rotatable packing rings to rotate; and a motor coupled to the rotatable shaft for driving the rotatable shaft;
   b. infusing the feed seawater stream by way of the exit port into the interior region, wherein the feed seawater stream passes radially outwardly through each of the one or more rotatable packing rings thereby forming the deaerated seawater stream having a lower concentration of the oxygen, the air, the nitrogen and/or the carbon dioxide therein than the feed seawater stream and a gas stream comprising the oxygen, the air, the nitrogen and/or the carbon dioxide having been removed from the feed seawater stream;
   c. removing the deaerated seawater stream from the housing through the liquid outlet; and
   d. removing the gas stream having at least partially passed through the one or more rotatable packing rings from the interior region through the gas outlet;
   wherein the rotating packed bed device further has a gas inlet in the housing in fluid communication with the one or more rotatable packing rings and wherein the method further comprises injecting a gas stream essentially free of oxygen through the gas inlet, wherein a ratio of the gas stream to the feed seawater stream is from 0.1 to 10 standard cubic feet of the gas stream per standard cubic feet of the feed seawater stream and the feed seawater stream and the gas stream pass through each of the one or more rotatable packing rings; and
   providing a separator in fluid communication with a hydrocarbon-producing-reservoir wherein the separator comprises at least an inlet and a separator gas outlet;
   separating produced fluids from the hydrocarbon-producing-reservoir in the separator into an oil phase, a gas phase and an aqueous phase; and passing the gas phase from the separator gas outlet of the separator to the gas inlet of the rotating packed bed device such that the gas phase is received as the gas stream essentially free of oxygen.

2. The method of claim 1, further comprising mixing the feed seawater stream with at least one of the group consisting of an oxygen scavenger, a biocide agent, an antiscalant agent and combinations thereof prior to or concurrently with infusing the feed seawater stream by way of the exit port into the interior region in step (b).

3. The method of claim 2, wherein the at least one oxygen scavenger comprises a compound selected from the group consisting of a bisulfite salt, a sodium sulfite, a sodium erythorbate, a hydrazine and combinations thereof.

4. The method of claim 1, further comprising sending the gas stream from the gas outlet of the rotating packed bed device to at least one of the group consisting of a vent, a flare, a vacuum pump and combinations thereof.

5. The method of claim 1, wherein a vacuum is applied to the gas outlet of the rotating packed bed device by connecting the gas outlet to a source of vacuum.

6. The method of claim 5, wherein the rotating packed bed device further comprises a vacuum port in the housing and/or in one or more level control vessel connected to the liquid outlet and the method further comprises applying the vacuum to the vacuum port.

7. The method of claim 5, wherein the source of vacuum comprises one or more liquid ring vacuum pumps, one or more ejectors or a combination thereof.

8. The method of claim 5, wherein the source of vacuum maintains a pressure in the rotating packed bed device at from 10 mm Hg to 250 mm Hg absolute.

9. The method of claim 5, wherein the source of vacuum maintains a pressure in the rotating packed bed device at from 15 mm Hg to 30 mm Hg absolute.

10. The method of claim 1, further comprising injecting the deaerated seawater stream into the hydrocarbon-producing-reservoir using a mechanism for water injection connected to the liquid outlet of the rotating packed bed device.

11. The method of claim 10, wherein the water injection means comprises one or more injection pumps.

12. The method of claim 11, wherein the liquid outlet of the rotating packed bed device is connected to one or more vessels for receiving the deaerated seawater stream and providing the deaerated seawater stream to the one or more injection pumps.

13. The method of claim 1, further comprising filtering the feed seawater stream prior to infusing the feed seawater stream into the interior region in step (b).

14. The method of claim 1, further comprising passing the feed seawater stream through a membrane unit for removing sulfates from the feed seawater stream prior to infusing the feed seawater stream into the interior region in step (b) or after passing the feed seawater stream through one or more level control vessels connected to the liquid outlet.

15. The method of claim 1, further comprising removing salts from the aqueous phase and passing the aqueous phase to a mechanism for water injection.

16. The method of claim 1, wherein the gas stream essentially free of oxygen is selected from the group consisting of a fuel gas, a methane, the nitrogen, the carbon dioxide and combinations thereof.

17. The method of claim 1, wherein the one or more rotatable packing rings rotate at a tip velocity of from 4 m/s to 80 m/s.

18. The method of claim 1, wherein the one or more rotatable packing rings rotate at a speed of from 500 to 2500 rpm.

19. A system for deaerating a feed seawater stream, comprising:
    a. a rotating packed bed device comprising one or more rotatable packing rings disposed within a housing wherein the one or more rotatable packing rings define an interior region; a liquid inlet in the housing for feeding a liquid into the interior region, the liquid inlet in communication via a conduit with an exit port disposed in the interior region for infusing the liquid into the interior region; a gas outlet in the housing for accepting a gas which has at least partially passed radially inwardly through the one or more rotatable packing rings and removing the gas from the interior region; a liquid outlet in the housing for removing a deaerated seawater stream from the housing; a rotatable shaft coupled to the one or more rotatable packing rings for causing the one or more rotatable packing rings to rotate; and a motor coupled to the rotatable shaft for driving the rotatable shaft;
    b. one or more level control vessels connected to the liquid outlet; and
    c. a mechanism for water injection connected to the one or more level control vessels for injecting the deaerated seawater stream into a hydrocarbon-producing-reservoir to enhance oil recovery from the hydrocarbon-producing-reservoir;
    wherein the rotating packed bed additionally has a gas inlet in fluid communication with the one or more rotatable packing rings for receiving a gas stream essentially free of oxygen and a separator in fluid communication with the hydrocarbon-producing-reservoir for separating produced fluids from the hydrocarbon producing reservoir into an oil phase, a gas phase and an aqueous phase, and further comprising a line connecting a separator gas outlet on the separator to the gas inlet of the rotating packed bed device such that the gas phase is received as the gas stream essentially free of oxygen.

20. The system of claim 19, further comprising a source of vacuum connected to the gas outlet of the rotating packed bed device.

21. The system of claim 19, further comprising at least one of the group consisting of a vent, a flare, a vacuum pump and combinations thereof connected to the gas outlet of the rotating packed bed device.

22. The system of claim 20, wherein the source of vacuum comprises one or more liquid ring vacuum pumps, one or more ejectors or a combination thereof.

23. The system of claim 20, wherein the source of vacuum is capable of maintaining a pressure in the rotating packed bed device at from 10 mm Hg to 250 mm Hg absolute.

24. The system of claim 19, further comprising a lift pump system connected to the liquid inlet of the rotating packed bed device for drawing a seawater from an ocean environment and a filter in fluid communication with the lift pump system for filtering the seawater.

25. The system of claim 19, further comprising a membrane unit connected to the liquid inlet of the rotating packed bed device or an outlet of the one or more level control vessels for removing sulfates from the feed seawater stream.

26. The system of claim 19, further comprising a filter in fluid communication with a produced water outlet on the separator for removing salts from an aqueous phase and a line connecting the filter to the mechanism for water injection.

27. The system of claim 19, wherein the rotating packed bed device further comprises a second liquid inlet for receiving one of the group consisting of an oxygen scavenger, a biocide agent, an antiscalant agent and combinations thereof.

28. The system of claim 19, wherein the rotating packed bed device has a height of from 12 feet to 20 feet.

29. The system of claim 19, wherein the liquid inlet of the rotating packed bed device further comprises a liquid distributor comprising a pipe having a central conduit and an annulus about the conduit, wherein the annulus is in fluid communication with a plurality of protruding tabs that extend into the interior region, the protruding tabs having a plurality of exit ports for infusing the liquid into the interior region, and wherein the central conduit in fluid communication with the interior region serves as the gas outlet.

30. The system of claim 19, further comprising: a source of gas essentially free of oxygen wherein the gas essentially free of oxygen is selected from the group consisting of a fuel gas, a methane, a nitrogen, a carbon dioxide and combinations thereof.

31. The system of claim 19, wherein the rotating packed bed device comprises two rotatable sets of packing rings.

32. The system of claim 31, wherein the exit port disposed for infusing the liquid into the interior region and the gas outlet in the housing for accepting the gas which has at least partially passed radially inwardly through the one or more rotatable packing rings and removing the gas from the interior region are orifices in a generally hollow cylindrical liquid distributor located in the interior region wherein the generally hollow cylindrical liquid distributor comprises a center conduit, gas outlet orifices extending radially therethrough and liquid-orifices extending radially therethrough.

33. The system of claim 31, wherein the two rotatable sets of packing rings rotate in a co-current direction.

34. The system of claim 31, wherein the two rotatable sets of packing rings rotate in a countercurrent direction.

35. The system of claim 31, wherein a rotation of each of the two rotatable sets of packing rings is driven by the shaft coupled to the motor.

36. The system of claim 19, wherein the rotatable packing rings are comprised of a porous material selected from the group consisting of metal foam, plastic, composite, stainless steel, titanium, super duplex stainless steel alloy, metal wire mesh, non-metal wire mesh, and glass.

37. The system of claim 19, wherein the water injection means comprises one or more injection pumps.

38. The system of claim 19, wherein the system comprises multiple rotating packed bed devices arranged in parallel such that the shaft coupled to the motor is coupled to the one or more rotatable packing rings of each of the multiple rotating packed bed devices.

39. The system of claim 19, wherein the system comprises multiple rotating packed bed devices arranged in series such that the liquid outlet of a first rotating packed bed device is connected to the liquid inlet of a second rotating packed bed device.

\* \* \* \* \*